United States Patent
Lindsay et al.

Patent Number: 6,105,020
Date of Patent: Aug. 15, 2000

[54] SYSTEM AND METHOD FOR IDENTIFYING AND CONSTRUCTING STAR JOINS FOR EXECUTION BY BITMAP ANDING

[75] Inventors: Bruce Gilbert Lindsay; Eugene Jon Shekita; David Everett Simmen, all of San Jose, Calif.; Kaarel Truuvert, Toronto, Canada

[73] Assignee: International Business Machines Corporation, Armonk, N.Y.

[21] Appl. No.: 09/415,799

[22] Filed: Oct. 11, 1999

[51] Int. Cl.[7] .................................................. G06F 17/30
[52] U.S. Cl. .................................................. 707/2; 707/3
[58] Field of Search .................................. 707/2, 3, 102, 707/4, 100

[56] References Cited

U.S. PATENT DOCUMENTS

| | | | |
|---|---|---|---|
| 5,519,859 | 5/1996 | Grace | 707/3 |
| 5,546,576 | 8/1996 | Cochrane et al. | 395/600 |
| 5,551,031 | 8/1996 | Cheng et al. | 395/600 |
| 5,557,791 | 9/1996 | Cheng et al. | 395/600 |
| 5,668,987 | 9/1997 | Schneider | 395/603 |
| 5,761,657 | 6/1998 | Hoang | 707/4 |
| 5,790,818 | 8/1998 | Martin | 395/330 |
| 5,835,634 | 11/1998 | Abrams | 382/222 |
| 5,845,276 | 12/1998 | Emerson et al. | 707/2 |
| 5,848,408 | 12/1998 | Jakobson et al. | 707/3 |
| 5,905,985 | 5/1999 | Malloy et al. | 707/100 |
| 5,926,818 | 7/1999 | Malloy | 707/100 |
| 5,940,818 | 8/1999 | Malloy et al. | 707/2 |
| 5,943,668 | 8/1999 | Malloy et al. | 707/3 |
| 5,960,428 | 9/1999 | Lindsay et al. | 707/4 |
| 5,963,932 | 10/1999 | Jakobson et al. | 707/2 |
| 5,978,788 | 11/1999 | Castelli et al. | 707/2 |
| 5,978,796 | 11/1999 | Malloy et al. | 707/3 |
| 5,991,754 | 11/1999 | Raitto et al. | 707/2 |
| 6,003,024 | 12/1999 | Bair et al. | 707/3 |
| 6,003,036 | 12/1999 | Martin | 707/102 |

*Primary Examiner*—Thomas G. Black
*Assistant Examiner*—Frantz Coby
*Attorney, Agent, or Firm*—John L. Rogitz

[57] ABSTRACT

A system and method for a relational database system for identifying star joins in a query and for breaking the query down for bitmap ANDing. The fact table of the star join is located, and cycles between and within dimension tables are broken. Then, the minimal set of tables necessary to execute the star join is identified, and the dimension tables that should appear in the bitmap ANDing plan are also identified. A bitmap ANDing plan is then generated, or, if the query does not qualify for bitmap ANDing, a conventional execution plan is generated.

25 Claims, 6 Drawing Sheets

SYSTEM AND METHOD FOR IDENTIFYING AND CONSTRUCTING STAR JOINS FOR EXECUTION BY BITMAP ANDING

BACKGROUND OF THE INVENTION

1. Field of the Invention

The present invention relates generally to relational database systems, and more particularly to systems and methods for undertaking star joins of data tables in relational databases.

2. Description of the Related Art

Relational database systems store large amounts of data, including business data that can be analyzed to support business decisions. For example, a relational database system can be used to store sales data including information on sales by time period, product, product line, geographic area, and so on, which can be usefully presented in response to a query to support a particular business decision. It will readily be appreciated that data can be presented in numerous ways to support a decision, depending on the particular decision (and, hence, query) being made.

To respond to a user query, relational database systems often undertake table joins, i.e., operations that relate data in two or more tables. As an example, suppose it is desired to know about sales of a particular product in a particular region during a particular quarter. To respond to such a query, the exemplary relational database system mentioned above could create four tables, namely, a PRODUCT table identifying products by name and identification, a REGION table identifying sales regions by name and identification, a TIME table defining fiscal quarters, and a relatively large SALES table identifying all sales by product identification, region identification, and quarter. To respond to the query, these four tables could be joined using a "star join", so called because of the appearance of the graphical representation used to depict the join.

More specifically, in a star join, a fact table is represented at being at the center node of a star, and lines (referred to as "edges") to so-called dimension tables that are represented by nodes in a graph radiate outwardly from the fact table. Usually, the fact table is an order of magnitude larger or more than the dimension tables, and the edges between the fact table and dimension tables represent the join predicates, i.e., the desired relationships between the tables as defined by the query. It further happens that a dimension can itself include multiple tables, with such a multi-table dimension being referred to as a "snowflake" because of the snowflake-like appearance of its graph. To simplify discussion, every dimension can be regarded as a snowflake, because single table dimensions are essentially degenerate snowflakes with one node. Accordingly, "snowflake" is synonymous with "dimension". Each snowflake has a root which corresponds to the snowflake node that is connected to the fact table F. In the above example, the SALES table would be the fact table of a star join, and the PRODUCT, REGION, and TIME tables would be the snowflakes.

As recognized herein, star joins typically process large amounts of data, and consequently special execution plans based on bitmap ANDing might be invoked by the query optimizer of a relational database system to improve the performance of the system by minimizing the number of fact table pages that must be read from disk. In bitmap ANDing, each bit corresponds to a fact table row. Continuing with the above example to illustrate, the PRODUCT table is accessed by the desired product name to determine the desired product identification, which is then used to probe a SALES table index on product identification. As intended by the present invention, the particular index used can be a so-called "B-tree", or bitmap index, or other appropriate index.

In any case, the index probes are used to produce a bitmap, wherein each bit corresponds to a row in the SALES table. Rows in the SALES table for sales of the desired product have their corresponding bits in the bitmap set to "1", while the remainder of the rows would have their bits set to "0". Similarly, second and third bitmaps are produced using the REGION and TIME tables, and then the three bitmaps are ANDED together, with the desired result—rows having all three corresponding bits in the three bitmaps equal to one—being fetched from the SALES table. While the present disclosure focusses on bitmaps for ease of disclosure, it is to be understood that the principles set forth herein can apply to bloom filters as described in the present assignee's U.S. patent application Ser. No. 08/919,739 now U.S. Pat. No. 5,960,428, incorporated herein by reference.

In light of the above, it may now be appreciated that efficiently and effectively identifying and executing star joins pursuant to a query can be an important tool for supporting decision making. As further recognized herein, however, a star join can be embedded within a complex query, and it may not always be obvious which parts of a query qualify as "snowflakes" and indeed which table should be regarded as the fact table. For example, U.S. Pat. No. 5,848,408 is directed to how to process snowflakes under certain limited conditions, but not how to find or identify snowflakes. Nonetheless, for the reasons set forth above a query optimizer must be able to identify not only which part of a query qualifies as a star join, but it must also break the star join portion of the query into a form suitable for bitmap ANDing.

The above difficulty in knowing what parts of a query qualify for bitmap ANDing and how to render an appropriate star join is particularly acute when predicates between tables in different snowflakes (or within a snowflake) cause cycles in the join graph. A cycle can be thought of as a closed polygon in the star join graph that is established by edges representing predicates between not only the fact table and tables in the snowflakes, but also between tables in different snowflakes. Such cycles can be introduced into the query either directly or by the addition of transitive predicates added by the query optimizer. In any case, the present invention recognizes the above-noted problems and provides the solutions disclosed herein.

SUMMARY OF THE INVENTION

A general purpose computer is programmed according to the inventive steps herein to undertake star joins of relational database tables. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including a general purpose computer and one or more input devices associated with the computer for generating a query. A database including tables is accessible to the computer, and logic is provided that is executable by the computer for undertaking method acts to respond to the query. These method acts include determining, from among the tables referenced in the query, a fact table and plural snowflakes. Also, the method embodied by the logic includes eliminating cycles among the tables, and determining a minimal set of tables in at least one snowflake. Moreover, the method embodied by the present logic includes determining which snowflakes should appear in a bitmap ANDing portion of a query execution plan to respond to the query.

In a preferred embodiment, the method acts embodied by the logic further include establishing, as the fact table, a largest one of the tables. Tables that have query predicates with the fact table are established as candidate snowflake root tables. Further, matching indices are defined as indices on the fact table that identify rows in the fact table matching rows of at least one candidate snowflake root table. Matching snowflake root tables are then established as being those candidate snowflake root tables that have at least one matching index, and a type of query execution plan is determined, based on whether at least two matching snowflake root tables have been established. Specifically, the preferred logic further determines to execute a bitmap ANDing execution plan only when at least two matching snowflake root tables have been established.

As set forth in greater detail below, the method embodied by the preferred logic includes establishing a join graph representing the query, with the join graph including nodes representing tables and edges between at least some nodes representing query predicates. Weights are then established for the edges based on at least one selectivity of the respective query predicates. Additionally, in the preferred logic, minimum selectivities of respective predicates on the matching indices are established as the weights for at least some edges. On the other hand, the weights for those edges between snowflake root tables other than matching snowflake root tables are defined to be infinite. These weights are incorporated into a minimum spanning tree for eliminating the cycles within and between snowflakes.

The preferred act of determining a minimal set of tables undertaken by the logic includes determining a selectivity of query predicates corresponding to edges of a join graph representing the query. A selectivity of an edge is then determined from at least one snowflake to the fact table. Moreover, the preferred act of determining which snowflakes should appear in a query execution plan includes determining, for at least one matching snowflake root table, a benefit in reducing the number of rows of the fact table after executing a bitmap ANDing query execution plan using the matching snowflake root table. A cost is also determined for obtaining a bitmap for rows of the fact table identified by the matching snowflake root table.

In another aspect, a computer-implemented method is disclosed for determining whether to execute a first query execution plan in response to a query. The method includes receiving a query for information stored in a database, and generating a join graph representative of the query. The join graph includes nodes representing at least one fact table and at least two snowflakes, it being understood that the fact and snowflake tables store the requested information. Also, the join graph includes edges between nodes, with the edges representing predicates related to the query. The method then includes eliminating cycles between and within snowflakes and determining a minimal set of tables in each snowflake. Which snowflakes should appear in the first query execution plan are determined. The first query execution plan is generated when it is determined that at two snowflakes should appear in the first query execution plan.

In still another aspect, a computer program device includes a computer program storage device readable by a digital processing apparatus and a program on the program storage device including instructions executable by the digital processing apparatus for analyzing a query. The program logic includes computer readable code means for generating a join tree representing the query, and the join tree includes data tables and query predicates therebetween. Computer readable code means prune at least some predicates, while computer readable code means generate a minimum spanning tree (MST) using a minimal set of tables. Moreover, the program logic includes computer readable code means for removing non-filtering tables from the MST.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
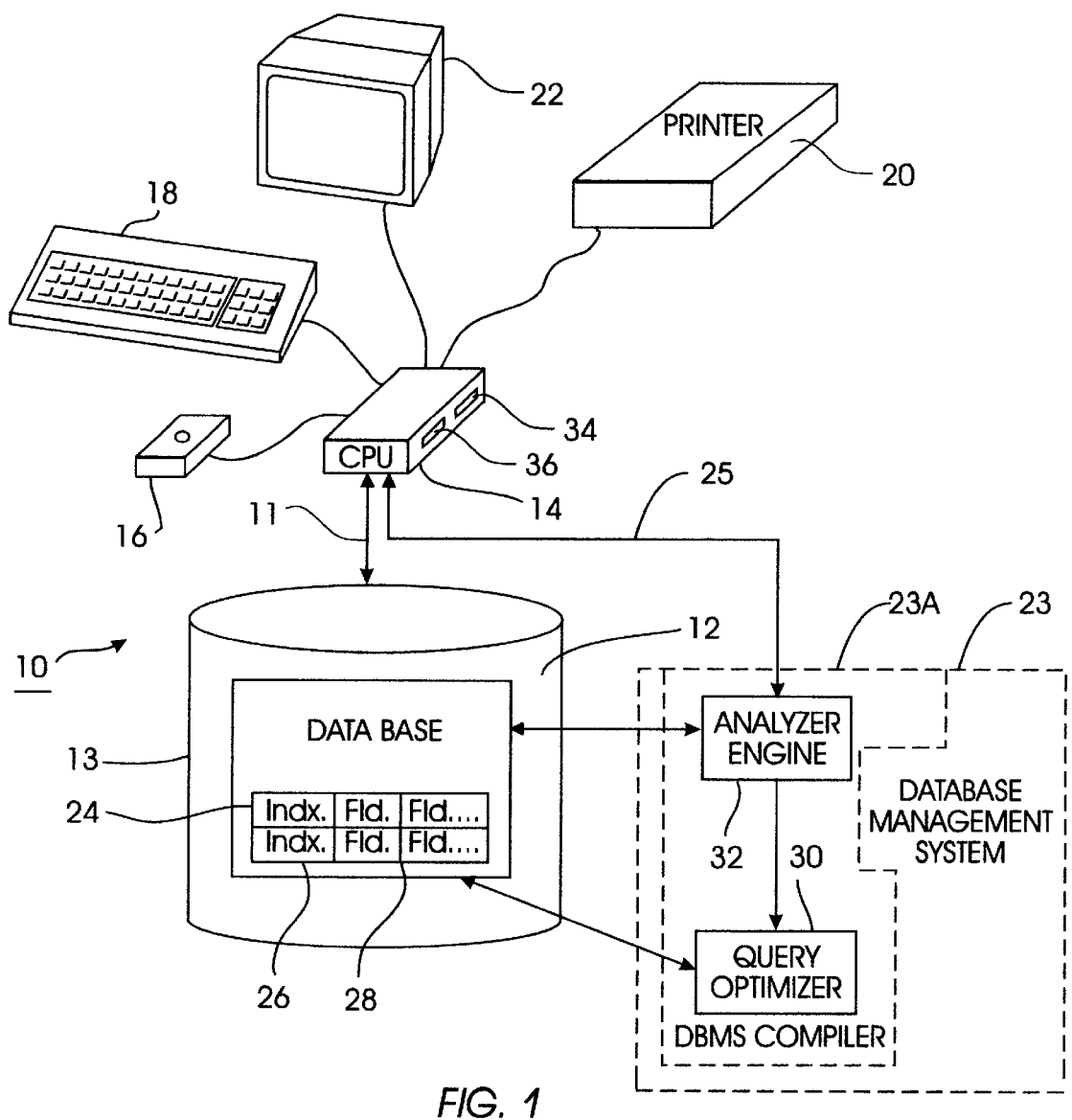
FIG. 1 is a schematic diagram showing the system of the present invention.

Referring initially to FIG. 1, a system is shown, generally designated 10, for analyzing a query for data in a database 12 and for generating a query execution plan in response. The data may reside, for example, in one or more storage devices such as the device 13. In the particular architecture shown, the system 10 includes a digital processing apparatus, such as a computer 14. In one intended embodiment, the computer 14 may be a personal computer made by International Business Machines Corporation (IBM) of Armonk, N.Y., or the computer 14 may be any computer, including computers sold under trademarks such as AS400, with accompanying IBM Network Stations. Or, the computer 14 may be a Unix computer, or OS/2 server, or Windows NT server, or IBM RS/6000 250 workstation or an IBM laptop computer.

As shown in FIG. 1, the computer 14 is electrically connected to one or more input devices, e.g., a mouse 16 and a keyboard 18, which can be manipulated by a user of the system 10 to generate queries for data. The response to a query can be output via an output device such as a printer 20 or monitor 22 that are conventionally coupled to the computer 14.

In one implementation of the present invention, a database management system (dbms) 23 of the compiling kind executes in the computer 14, receiving, among other things, user requests that contain database queries. The dbms 23 processes the queries, providing access to the database 12. The dbms 23 includes a compiler 23a, which may also be referred to as a "bind" component.

FIG. 1 shows that the storage device containing the database 12 electronically stores a plurality of data records 24 that can be arranged in tabular form as shown. Each data record 24 can include an index element 26 and a plurality of field elements 28, commonly referred to as attributes. For example, each data record 24 may contain sales information, with the fields 28 containing values for attributes of the sale such as amount of sale, when the sale was made, where the sale was made, the product that was sold, and so on.

In but one illustrative use of the present invention, the user might want to retrieve information from the database 12 by generating a query, and to do so the user manipulates the mouse 16 or keyboard 18 as appropriate. Typically, a query is executed in the context of an application program containing database queries. Prior to execution of the application program, it is compiled. During compilation, the queries in the application program are removed and replaced with calls to routines which are bound to the application program. These routines are optimized machine language procedures produced by compilation of the application program queries by the dbms compiler 23a.

During compilation, the computer 14 receives the application program and forwards the query statements over an information path 25 to a query optimizer 30 that is included in the compiler 23a for determining how to efficiently retrieve the requested data, based on the user-defined predicates. As but one example, the query optimizer can be one of the optimizers discussed by Jarke et al. in "Query Optimization in Database Systems", 16 ACM Computing Surveys 2 (June 1984).

As intended by the present invention, the dbms compiler 23a includes an analyzer engine 32 coupled to the query optimizer 30. In accordance with the method described below, the query optimizer 30 optimizes the query execution plan based in part on the outcome of the below-disclosed logic of the engine 32. It is to be understood that the components such as the query optimizer 30 and engine 32 can be included in dbms compiler software contained in an appropriate electronic data storage that includes, e.g., a hard disk drive 34 and optical disk drive 36 conventionally coupled to the computer 14.

The flow charts herein illustrate the structure of the analyzer engine of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the analyzer engine 32 may be a computer program that is executed by a processor within the computer 14 as a series of computer-executable instructions. In addition to the drives 34, 36, these instructions may reside, for example, in RAM of the computer 14, or the instructions may be stored on a DASD array, magnetic tape, electronic read-only memory, or other appropriate data storage device. In an illustrative embodiment of the invention, the computer-executable instructions may be lines of compiled C$^{++}$ compatible code.

Figure 2:
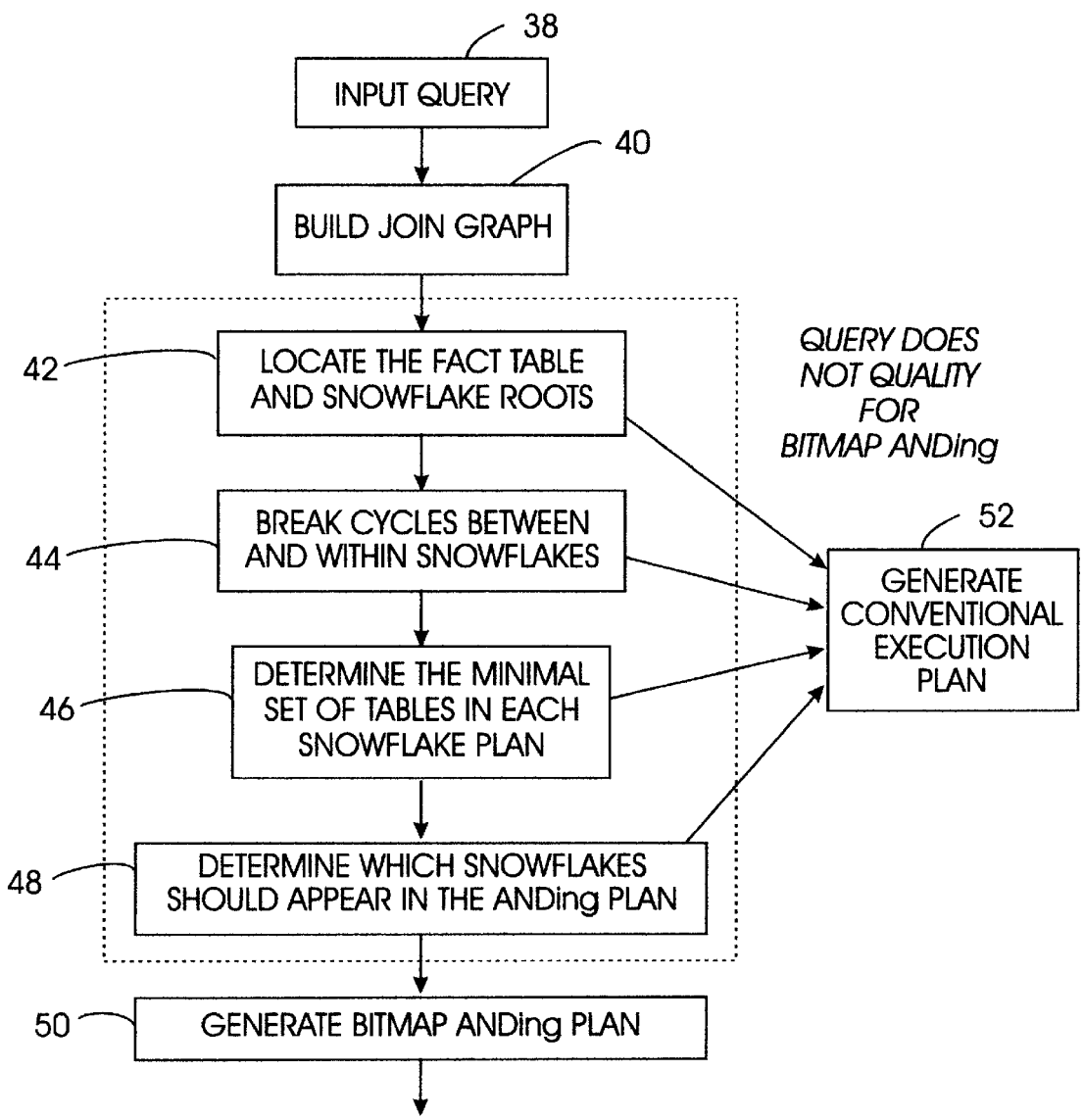
FIG. 2 is a flow chart showing the overall steps of the present logic.

Now referring to FIG. 2, the overall steps of the present logic can be seen. Commencing at block 38, a query is input and received, and at block 40 a join graph representative of the query is built. The join graph includes nodes that represent tables, with the tables containing data necessary to respond the query. Also, the join graph includes edges connecting the nodes, with the edges representing join predicates as defined by or derived from the query.

In addition to the join graph, database statistics are also input or otherwise provided at block 40. These statistics are used in accordance with relational database principles to determine the size of tables, indices that are available on the tables, and selectivity of local and join predicates, for purposes to be shortly disclosed.

As disclosed more fully below in reference to FIGS. 3 and 4, at block 42 of FIG. 2 a fact table is located, i.e., identified from among the tables in the join graph. Also, multi-table dimensions, referred to herein as snowflakes, are identified at block 42. More particularly, a subset of the tables in the snowflakes, referred to herein as snowflake root tables, are identified at block 42. Each snowflake can include plural sub-tables.

From block 42, the logic moves to block 44, wherein cycles within the join graph are broken by, e.g., eliminating portions of the cycles, namely, by eliminating one or more edges that make up the cycles, as discussed more fully below in reference to FIG. 4. Proceeding to block 46, a minimal set of tables that constitute each snowflake is determined as more fully explained in reference to FIGS. 5 and 6. Then, at block 48 the details of FIG. 7, namely, determining which snowflakes should appear in a bitmap ANDing query execution plan, are undertaken. The bitmap ANDing plan itself is generated at block 50. Alternatively, as set forth more fully below if the query is found to not qualify for bitmap ANDing, the logic proceeds to block 52 to generate a conventional query execution plan.

Figure 3:
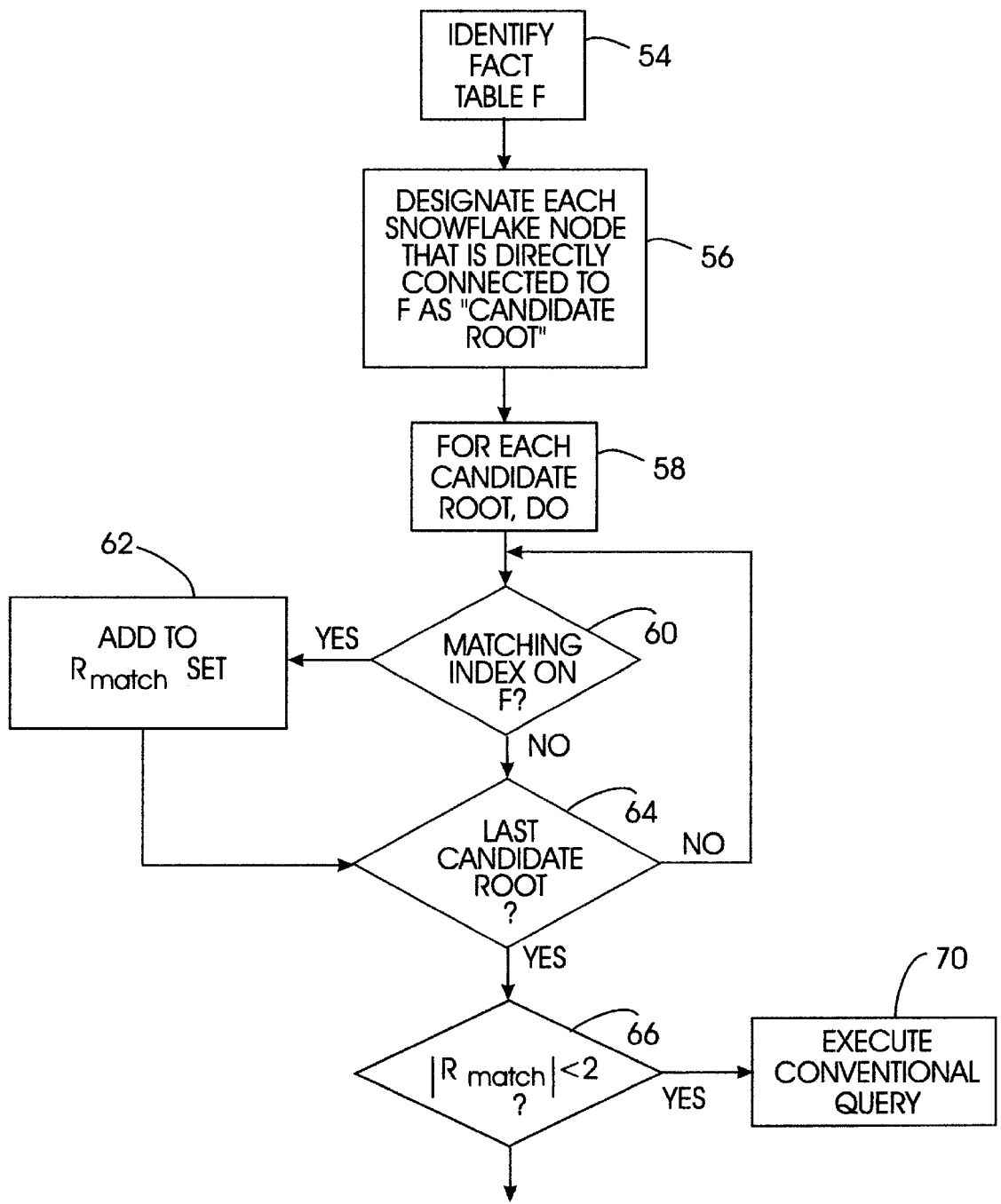
FIG. 3 is a flow chart showing the logic for locating snowflake roots.
Figure 4:
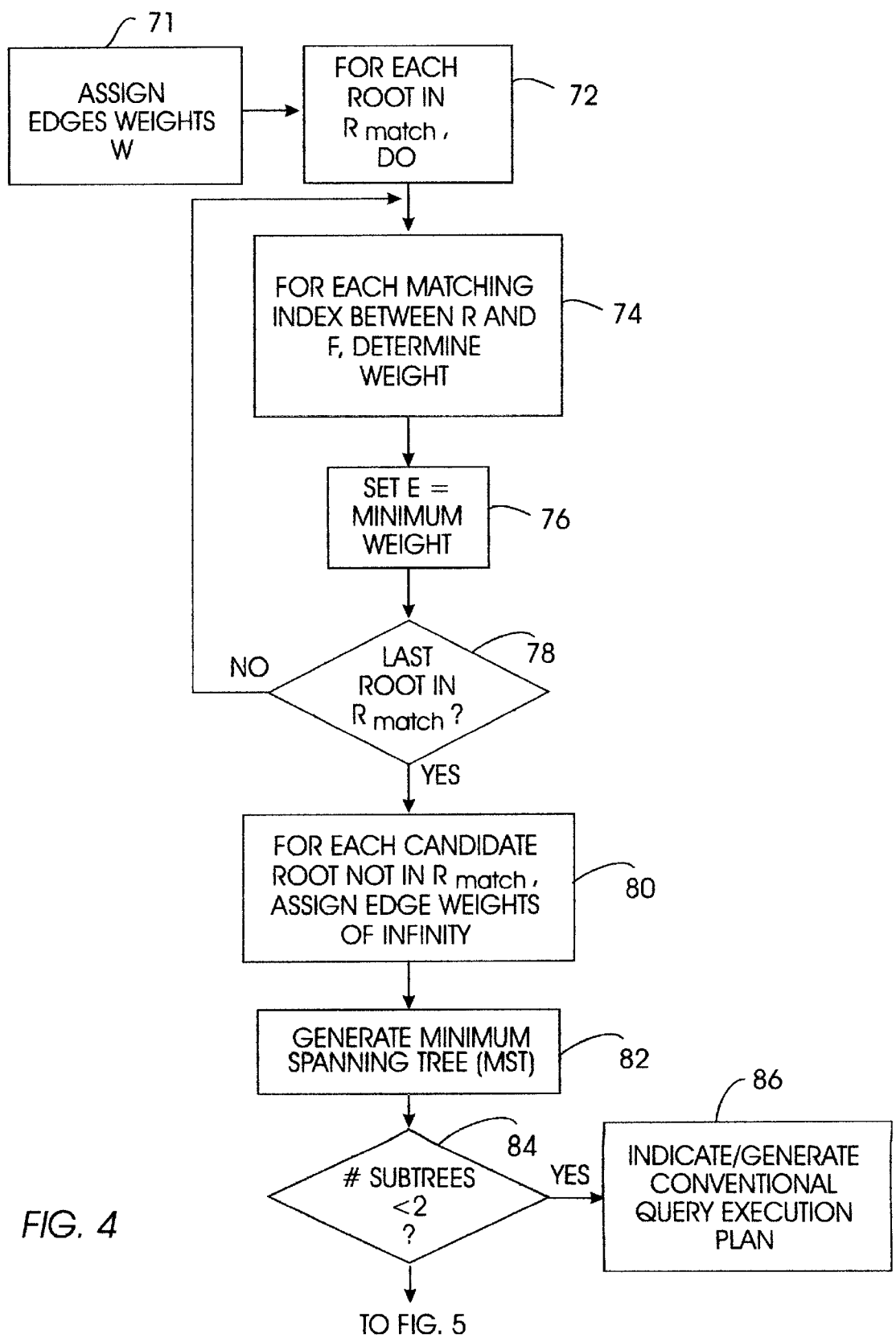
FIG. 4 is a flow chart showing the logic for breaking cycles in snowflakes.

Now referring to FIG. 3, at block 54 the fact table F is identified from among the query tables. Ordinarily, the largest table is designated as the fact table F, using the database statistics provided at block 40 in FIG. 2. Other criteria, however, that are based on database statistics or relationships between tables can also be used to select the fact table F.

Proceeding from block 54 to block 56, each of the remaining tables (i.e., the dimension tables, also referred to as snowflakes) that is directly connected to the fact table F by an edge in the join graph is designated as a "candidate snowflake root" and added to a set of candidates $R_{candidate}$. Proceeding to block 58, a DO loop is entered for each table in the set $R_{candidate}$. As shown in FIG. 3, the DO loop causes the logic to proceed to decision diamond 60, wherein it is determined, for the table under test, whether the table has a matching index on the fact table F. By "matching index" is meant the following. If a table R is connected to the fact table F by one or more edges (i.e., join predicates) J, then R has a matching index on F if there is some index on F that can efficiently identify the rows in F that satisfy at least one of the join predicates J. In other words, a candidate snowflake root table R has a matching index on the fact table F as long as some join predicate J exists between R and F with a matching index on F.

If the test at decision diamond 60 is positive, the logic moves to block 62 to add the table under test to a set of matching snowflake roots $R_{match}$. From block 62, or from decision diamond 60 if the test there was negative, the logic moves to decision diamond 64 to determine whether the last candidate snowflake root table has been tested. If not, the logic retrieves the next table and loops back to decision diamond 60. In contrast, after all candidate root tables have been tested, the logic exits the DO loop and proceeds to decision diamond 66 to determine whether the cardinality of the set $R_{match}$ is less than two (2). If it is, indicating that the input join graph does not qualify for bitmap ANDing, the logic of the present invention ends at block 70, wherein a conventional query execution plan is generated. Otherwise, the logic continues to FIG. 4.

Beginning at 71, a weight W is assigned to every edge equal to the join selectivity of the predicates associated with the edge. Then, at blocks 72–78 the weights for edges between root tables and the fact table are computed. More specifically, at block 72 a DO loop is entered for each snowflake root table in the set $R_{match}$. Moving to block 74, for each matching index between the snowflake root table R under test and the fact table F, a weight is determined. To do this, the weight of a matching index is set equal to the selectivity of all the join predicates between the table R under test and the fact table F that can be evaluated using the index, with the weight being set equal to the selectivity, using the database statistics provided at block 40 in FIG. 2. Next, at block 76 the weight W of the edge is set equal to the minimum weight among all the matching indices.

The DO loop then determines, at decision diamond 78, whether all tables in the set $R_{match}$ have been tested, and if not retrieves the next table and then loops back to block 74. At the end of the DO loop, the logic moves to block 80 to assign edge weights of infinity to each edge between the fact table F and an $R_{candidate}$ root that is not also in the matching set $R_{match}$. In this way, these tables are not included in the minimum spanning tree (MST) discussed below. More particularly, a MST is generated at block 82 using the tables (and associated edge weights) in the set $R_{match}$. In one preferred embodiment, the MST is generated in accordance with principles set forth in Aho et al., *Data Structures and Algorithms*, Addison-Wesley 1983. At the root of the MST is the fact table F, and the snowflake root tables in $R_{match}$ are represented by respective subtrees that are connected to the root along respective edges. It is to be understood that one snowflake might be merged into another snowflake in accordance with MST principles, should the weight of its root edge be greater than the weight of some edge joining some table in another snowflake. It is to be further understood that, as indicated at decision diamond 84, if the number of snowflakes in the MST is less than two (2), the input graph does not qualify for bitmap ANDing and the logic of the present invention consequently ends at block 86 by indicating that a conventional query execution plan is to be generated. Otherwise, the logic continues to FIG. 5. In any case, once generated the MST eliminates cycles within and between snowflakes.

Figure 5:
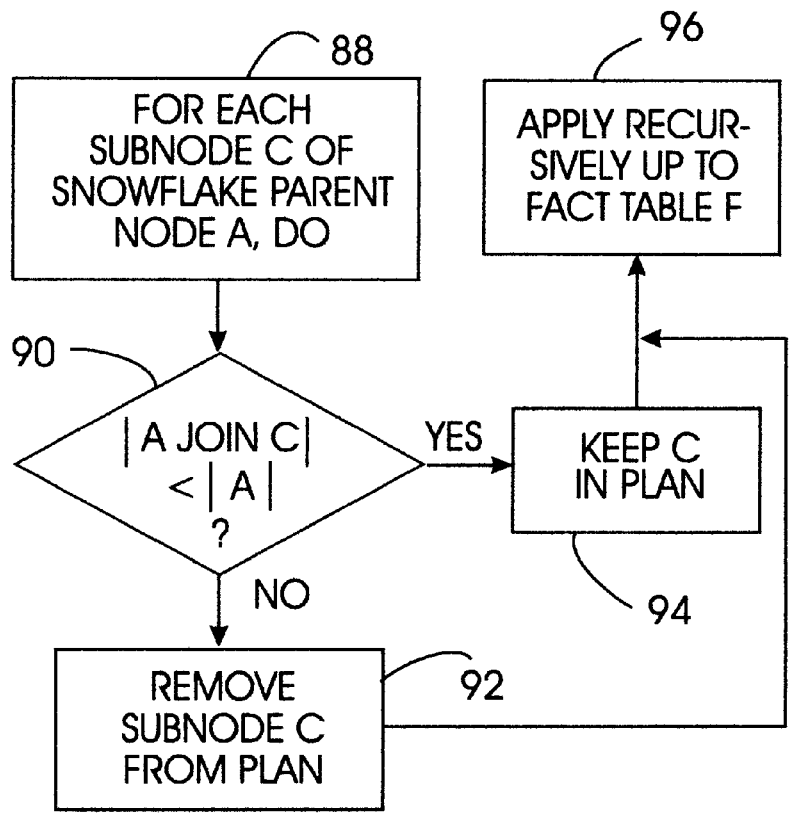
FIG. 5 is a flow chart showing the logic for determining a minimal set of tables in the bitmap ANDing plan.
Figure 6:
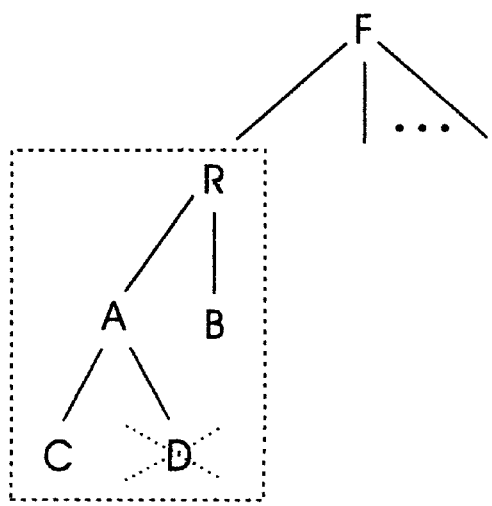
FIG. 6 is a schematic diagram of a minimum spanning tree illustrating the logic of FIG. 5.

Now referring to FIGS. 5 and 6, at block 88 a DO loop is entered for each snowflake subnode in a snowflake using a post-order search, i.e., starting with the subnode that is furthest from the root node of the snowflake. This is illustrated in FIG. 6, which shows a snowflake root node R (representing a snowflake root table in the MST), first level subnodes A and B connected directly to the root R by respective edges, and second level subnodes C and D connected directly to the first level subnode A by respective edges. The first iteration through the DO loop for the second level subnodes, for subnode C in this example, the logic determines, at decision diamond 90, whether the subnode has a filtering effect on its parent node (in this example, node A) by simulating the bottom-up cardinality estimation performed in query optimization. As understood herein, by including only subnodes that have filtering effects, the number of tables used to execute the bitmap ANDing portions of the query will be fewer and, hence, the query execution will be faster.

In the preferred embodiment, to determine whether a subnode C has a filtering effect, it is determined whether the cardinality of the join of the subnode under test (in this case, the node C) with its parent (in this case, A) is smaller than the cardinality of the parent node alone. If it is not, the subnode under test does not reduce the cardinality of its parent node and is discarded from the bitmap ANDing portion of the execution plan at block 92; otherwise, the subnode is kept in the plan at block 94.

The logic then loops to block 96 to apply the logic recursively up the MST to the fact table node F. In the example shown, the logic would next retrieve the remaining second level subnode, i.e., subnode D, and determine whether the cardinality of A join D is smaller than the cardinality of A. In the example shown in FIG. 6 it is assumed that the subnode D does not provide adequate filtering, and consequently the subnode D is discarded from the plan at block 92 in FIG. 5 and as indicated in FIG. 6. The procedure is applied recursively, such that it is next determined whether the cardinality of A join C join R is less than the cardinality of R, and so on. Ultimately, assuming that only the subnode D fails the filtering test, it is determined whether the entire snowflake filters the fact table F by determining whether the cardinality of {A join C join R join B join F} is less than the cardinality of {F}. Each snowflake root R is tested in the above-disclosed manner.

Figure 7:
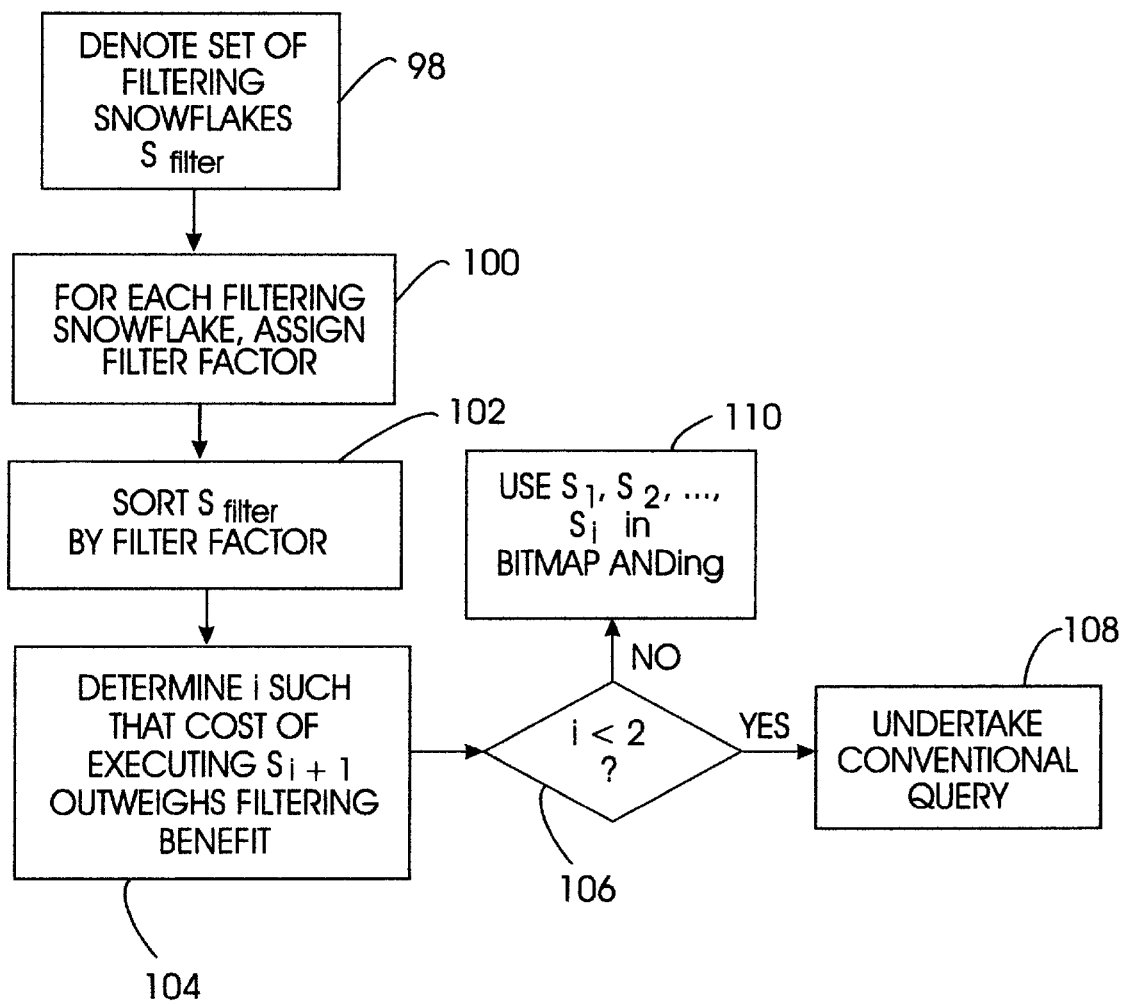
FIG. 7 is a flow chart showing the logic for determining which snowflakes should appear in the bitmap ANDing plan.

Having determined a minimal set of tables in each snowflake, the logic moves to FIG. 7, recognizing that even though a snowflake might filter the fact table F, the cost of executing a bitmap ANDing plan with the table might nonetheless outweigh the benefit of including the snowflake in the plan.

With this in mind, at block 98 the set of filtering snowflakes can be denoted $S_{filter}$. Proceeding to block 100, a filter factor is assigned to each snowflake in the set $S_{filter}$. The filter fact corresponds to how much the snowflake filters the fact table F. Using the example of FIG. 6, the filter factor of the snowflake with root at R would be:

$$\{|A \text{ join } C \text{ join } R \text{ join } B \text{ join } F|\}/F$$

After determining the filter factors at block 100, the logic proceeds to block 102 to sort the set of tables in $S_{filter}$ by filter factor in ascending order. The sorted list can be denoted S1, S2, S3, . . . ,Sn. Next, at block 104 a variable i is determined such that the cost of executing a query plan that includes the table S(i+1) outweighs the benefit it provides in filtering the fact table F, with only the tables S1, S2, S3, . . . ,Si being included in the plan. Specifically, it is determined whether the benefit in reducing the number of rows of the fact table after executing a bitmap ANDing query execution plan using the snowflake root table outweighs the cost of obtaining a bitmap for rows of the fact table F identified by the snowflake root table.

Next determining at decision diamond 106 whether i is less than two, the logic undertakes a conventional query at block 108 if i is less than two, and otherwise the logic uses the tables S1, S2, S3, . . .,Si in a bitmap ANDing plan at block 110.

While the particular SYSTEM AND METHOD FOR IDENTIFYING AND CONSTRUCTING STAR JOINS FOR EXECUTION BY BITMAP ANDING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:

a general purpose computer;

one or more input devices associated with the computer for generating a query;

a database including tables accessible to the computer;

logic executable by the computer for undertaking method acts to respond to the query, the method acts comprising:

determining, among the tables of the query, a fact table and plural snowflakes of tables;

eliminating cycles among the tables of the query;

determining a minimal set of tables in at least one snowflake; and determining which snowflakes should appear in a predetermined stage of a query execution plan.

2. The system of claim 1, wherein the method acts embodied by the logic further include establishing, as the fact table, a largest one of the tables.

3. The system of claim 2, wherein the method acts embodied by the logic further include:

establishing, as candidate snowflake root tables, tables having query predicates with the fact table;

defining matching indices as indices on the fact table that identify rows in the fact table matching rows of at least one candidate snowflake root table;

establishing, as matching snowflake root tables, candidate snowflake root tables having at least one matching index; and determining a type of query execution plan based on whether at least two matching snowflake root tables have been established.

4. The system of claim 3, wherein the method acts embodied by the logic further include determining to execute a bitmap ANDing execution plan only when at least two matching snowflake root tables have been established.

5. The system of claim 3, wherein the eliminating act undertaken by the logic further includes:

establishing a join graph representing the query, the join graph including nodes representing tables and edges between at least some the nodes representing query predicates; and establishing weights for the edges based on at least one selectivity of the respective query predicates.

6. The system of claim 5, wherein the acts undertaken by the logic further include establishing, as weights for at least some edges, minimum selectivities of respective predicates on the matching indices.

7. The system of claim 6, wherein the acts undertaken by the logic further include defining, as weights for edges between the fact table and snowflake root tables other than matching snowflake root tables, to be infinite.

8. The system of claim 7, wherein the eliminating act undertaken by the logic further includes incorporating the weights in a minimum spanning tree for eliminating the cycles.

9. The system of claim 8, wherein the method acts embodied by the logic further include determining to execute a bitmap ANDing execution plan only when at least two matching snowflake root tables remain connected to the fact table after the eliminating act.

10. The system of claim 1, wherein the act of determining a minimal set of tables further includes:

determining a selectivity of query predicates corresponding to edges of a join graph representing the query; and determining a selectivity of an edge from at least one snowflake to the fact table.

11. The system of claim 3, wherein the act of determining which snowflakes should appear in a bitmap ANDing stage of the query execution plan includes:

determining, for at least one matching snowflake root table, a benefit in reducing the number of rows of the fact table after executing a bitmap ANDing query execution plan using the matching snowflake root table; and determining, for at least one matching snowflake root table, a cost of obtaining a bitmap for rows of the fact table identified by the matching snowflake root table.

12. A computer-implemented method for determining whether to execute a first query execution plan in response to a query, comprising:

receiving a query for information stored in a database;

generating a join graph representative of the query, the join graph including:

nodes representing at least one fact table and at least one snowflake composed of at least one table, the tables storing the requested information, the join graph also including edges between nodes, the edges representing predicates related to the query;

eliminating cycles between and among snowflakes;

determining a minimal set of tables in at least one snowflake;

determining which snowflakes should appear in the first query execution plan; and generating the first query execution plan when it is determined that at two snowflakes should appear in the first query execution plan.

13. The method of claim 12, wherein the first query execution plan includes a bitmap ANDing plan.

14. The method of claim 13, further comprising:

establishing, as the fact table, a largest one of the tables;

establishing, as candidate snowflake root tables, tables having query predicates with the fact table;

defining matching indices as indices on the fact table that identify rows in the fact table matching rows of at least one candidate snowflake root table; and establishing, as matching snowflake root tables, candidate snowflake root tables having at least one matching index.

15. The method of claim 14, wherein the eliminating act further includes:

establishing weights for the edges of the join graph based on a selectivity of the respective query predicates; and establishing, as weights for at least some edges, minimum selectivities of respective predicates on the matching indices.

16. The method of claim 15, further comprising:

defining, as weights for edges between the fact table and snowflake root tables other than matching snowflake root tables, to be infinite;

incorporating the weights in a minimum spanning tree for eliminating the cycles; and determining to execute a bitmap ANDing execution plan when at least two matching snowflake root tables remain connected to the fact table after the eliminating act.

17. The method of claim 13, wherein the act of determining a minimal set of tables further includes:

determining a selectivity of query predicates corresponding to edges of a join graph representing the query; and determining a selectivity of an edge from at least one snowflake to the fact table.

18. The method of claim 14, wherein the act of determining which snowflakes should appear in a bitmap ANDing portion of a query execution plan includes:

determining, for at least one matching snowflake root table, a benefit in reducing the number of rows of the fact table after executing a bitmap ANDing query execution plan using the matching snowflake root table; and determining, for at least one matching snowflake root table, a cost of obtaining a bitmap for rows of the fact table identified by the matching snowflake root table.

19. A computer program device comprising:

a computer program storage device readable by a digital processing apparatus; and a program on the program storage device and including instructions executable by the digital processing apparatus for performing method acts for analyzing a query, the program comprising:

computer readable code means for generating a join tree representing the query, the join tree including data tables and query predicates therebetween;

computer readable code means for pruning at least some predicates;

computer readable code means for generating a minimum spanning tree (MST) using a minimal set of tables; and computer readable code means for removing non-filtering tables from the MST.

20. The device of claim 19, further comprising computer readable code means for removing a table from the MST if the cost of using the table outweighs the benefit.

21. The device of claim 20, wherein the join tree includes nodes representing respective tables and edges representing respective query predicates, and the device further comprises:

computer readable code means for establishing, as a fact table, a largest one of the tables;

computer readable code means for establishing, as candidate snowflake root tables, tables having query predicates with the fact table;

computer readable code means for defining matching indices as indices on the fact table that identify rows in the fact table matching rows of at least one candidate snowflake root table; and computer readable code means for establishing, as matching snowflake root tables, candidate snowflake root tables having at least one matching index.

22. The device of claim 21, further comprising:

computer readable code means for establishing weights for the edges of the join graph based on a selectivity of the respective query predicates; and computer readable code means for establishing, as weights for at least some edges, minimum selectivities of respective predicates on the matching indices.

23. The device of claim 22, further comprising:

computer readable code means for defining, as weights for edges between snowflake root tables other than matching snowflake root tables, to be infinite;

computer readable code means for incorporating the weights into the MST for eliminating the cycles; and computer readable code means for determining to execute a bitmap ANDing execution plan when at least two matching snowflake root tables remain connected to the fact table after the MST is generated.

24. The device of claim 21, wherein the means for generating the MST further includes:

computer readable code means for determining a selectivity of an edge from at least one snowflake to the fact table.

25. The device of claim 21, wherein the means for removing a table from the MST further comprises:

computer readable code means for determining, for at least one matching snowflake root table, a benefit in reducing the number of rows of the fact table after executing a bitmap ANDing query execution plan using the matching snowflake root table; and computer readable code means for determining, for at least one matching snowflake root table, a cost of obtaining a bitmap for rows of the fact table identified by the matching snowflake root table.

* * * * *